(12) United States Patent
Lang et al.

(10) Patent No.: US 12,614,945 B2
(45) Date of Patent: Apr. 28, 2026

(54) SLIDING COVER FOR A SALIENT-POLE ROTOR, HAVING A SLIDABLE SUPPORT, SALIENT-POLE ROTOR, AND ELECTRIC MACHINE

(71) Applicant: Bayerische Motoren Werke Aktiengesellschaft, Munich (DE)

(72) Inventors: Markus Lang, Munich (DE); Jerome Ragot, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 202 days.

(21) Appl. No.: 18/567,820

(22) PCT Filed: Jul. 26, 2022

(86) PCT No.: PCT/EP2022/070859
§ 371 (c)(1),
(2) Date: Dec. 7, 2023

(87) PCT Pub. No.: WO2023/025494
PCT Pub. Date: Mar. 2, 2023

(65) Prior Publication Data
US 2024/0283317 A1 Aug. 22, 2024

(30) Foreign Application Priority Data
Aug. 25, 2021 (DE) ..................... 10 2021 122 001.7

(51) Int. Cl.
*H02K 3/487* (2006.01)
*H02K 1/24* (2006.01)

(52) U.S. Cl.
CPC .............. *H02K 3/487* (2013.01); *H02K 1/24* (2013.01)

(58) Field of Classification Search
CPC ........... H02K 3/487; H02K 3/493; H02K 1/24
(Continued)

(56) References Cited

U.S. PATENT DOCUMENTS

| | | | | |
|---|---|---|---|---|
| 2,990,487 A | * | 6/1961 | Stigler | H02K 3/487 29/451 |
| 4,091,528 A | * | 5/1978 | Khutoretsky | H02K 9/00 310/59 |

(Continued)

FOREIGN PATENT DOCUMENTS

| | | |
|---|---|---|
| DE | 198 18 150 A1 | 10/1999 |
| DE | 10 2018 202 945 A1 | 8/2019 |

(Continued)

OTHER PUBLICATIONS

International Search Report (PCT/ISA/210) issued in PCT Application No. PCT/EP2022/070859 dated Nov. 28, 2022 with English translation (6 pages).

(Continued)

*Primary Examiner* — Michael Andrews
(74) *Attorney, Agent, or Firm* — Crowell & Moring LLP

(57) ABSTRACT

A sliding cover for a salient-pole rotor of an electric machine is configured to close a slot formed between two rotor poles of the salient-pole rotor which are adjacent in the peripheral direction and two supporting rings of the salient-pole rotor which are mutually axially opposite. The sliding cover is of a multi-part design and includes a slot wedge, which can be mechanically connected to the two adjacent rotor poles; a support, which is linearly guided in the slot wedge and includes a sealing surface of the sliding cover for pressing against at least one of the supporting rings and can be slid axially along the slot wedge in order to change the axial position of the sealing surface.

9 Claims, 4 Drawing Sheets

(58) Field of Classification Search
USPC ......................................................... 310/214
See application file for complete search history.

(56) References Cited

U.S. PATENT DOCUMENTS

| | | | |
|---|---|---|---|
| 5,118,979 A * | 6/1992 | Shih ......................... | H02K 3/51 |
| | | | 310/214 |
| 6,252,328 B1 * | 6/2001 | Brem ..................... | H02K 3/487 |
| | | | 310/201 |
| 7,821,171 B2 | 10/2010 | Lemmers, Jr. et al. | |
| 10,243,436 B2 | 3/2019 | Park et al. | |
| 2020/0127525 A1 | 4/2020 | Vohlgemuth | |
| 2021/0036571 A1 | 2/2021 | Eckstein et al. | |
| 2021/0159751 A1 | 5/2021 | Tavakoli et al. | |

FOREIGN PATENT DOCUMENTS

| | | | |
|---|---|---|---|
| GB | 906508 A | 9/1962 | |
| JP | 49-78701 U | 7/1974 | |
| JP | 54-33902 U | 3/1979 | |
| JP | 2019-47679 A | 3/2019 | |
| WO | WO 2019/224036 A1 | 11/2019 | |

OTHER PUBLICATIONS

German-language Written Opinion (PCT/ISA/237) issued in PCT Application No. PCT/EP2022/070859 dated Nov. 28, 2022 with English translation (9 pages).
German-language Search Report issued in German Application No. 10 2021 122 001.7 dated Jun. 29, 2022 with partial English translation (11 pages).

* cited by examiner

SLIDING COVER FOR A SALIENT-POLE ROTOR, HAVING A SLIDABLE SUPPORT, SALIENT-POLE ROTOR, AND ELECTRIC MACHINE

BACKGROUND AND SUMMARY

The invention relates to a sliding cover for a salient-pole rotor of an electric machine, wherein the sliding cover is designed to close a slot formed between two rotor poles of the salient-pole rotor which are adjacent in the circumferential direction and two axially opposite supporting rings of the salient-pole rotor. The invention also relates to a salient-pole rotor and to an electric machine.

In the present case, interest is focused on electric machines which can be used, for example, as drive machines for electrified motor vehicles, i.e. electric or hybrid vehicles. Such electric machines conventionally have a positionally fixed stator with energisable stator windings, and a rotor which is mounted rotatably with respect to the stator. In the case of an externally excited machine, the rotor also has energisable rotor windings. The latter can be wound in a rotor in a salient-pole design around salient poles or rotor poles of a rotor core of the rotor. Slots or pole gaps are formed between the rotor poles. On axially opposite end faces of the rotor core, the windings form winding heads which are encased by in each case an end cap or a supporting ring for stability reasons. In addition, the rotor has potting compound which, for example, is filled into the pole gaps in order to stabilize the salient-pole rotor. For the radial and axial sealing of the rotor against the escape of the potting compound, the rotor is secured by sliding covers which close the slots. For axial sealing, the sliding covers are conventionally pushed axially against a seal of the supporting rings, which is therefore compressed and produces the sealing effect.

A problem in this connection is that a plurality of component tolerances have to be absorbed at corners of the rotor core, the sliding cover and the supporting ring, and the tolerances from the two ends of the rotor are coupled to one another via the sealing concept of a sliding cover. This places very exacting requirements on the tolerance quality of each individual component and, in the most unfavorable case, can fluctuate between the component not being able to be fitted or the sealing effect being absent. This results in high costs due to the tolerance requirements and the rejected components.

It is the object of the present invention to provide a salient-pole rotor for an electric machine, which can be sealed in a simple manner.

This object is achieved by a sliding cover, a salient-pole rotor and an electric machine having the features according to the claimed invention.

A sliding cover according to embodiments of the invention for a salient-pole rotor of an electric machine is designed to close a slot formed between two rotor poles of the salient-pole rotor which are adjacent in the circumferential direction and two axially opposite supporting rings of the salient-pole rotor. The sliding cover is of multi-part design and has a slot closing wedge, and at least one support which is guided in the slot closing wedge. The slot closing wedge is mechanically connectable to the two adjacent rotor poles. The at least one support has a sealing surface of the sliding cover for pressing against at least one of the supporting rings and can be displaced axially with respect to the slot closing wedge in order to change an axial position of the sealing surface.

The invention also relates to a salient-pole rotor for an electric machine, having rotor windings for forming a rotor magnetic field, and a rotor core. The rotor core can be formed, for example, as a laminated core consisting of axially stacked electric laminations. The rotor core has an, in particular, annular rotor yoke and a number of rotor poles corresponding to a number of rotor windings for holding the rotor windings. The rotor windings form winding heads on axially mutually opposite end faces of the rotor core. The salient-pole rotor also has supporting rings arranged on the end faces for encasing the winding heads, and at least one sliding cover according to embodiments of the invention for closing at least one slot formed between two rotor poles. The support which is displaceable axially along the slot closing wedge is positioned in such a manner that it is pressed against at least one of the supporting rings for sealing purposes.

An electric machine according to embodiments of the invention for a motor vehicle has a stator and a salient-pole rotor according to embodiments of the invention, which is mounted rotatably with respect to the stator. The electric machine is in particular an externally excited or current-excited internal-rotor synchronous machine (SSM). The rotor is manufactured in a salient-pole design. For this purpose, the rotor poles or salient poles are arranged on the annular rotor yoke and in each case have a rotor tooth or rotor shaft arranged on the rotor yoke, and a pole shoe arranged on the rotor tooth. The pole shoes form an outer side of the rotor core. Winding wires of the rotor windings are wound around the rotor teeth and are held on the rotor teeth by the pole shoes. The pole gaps or slots via which the winding wires can be wound around the rotor teeth are formed between the rotor poles. The winding heads which form the rotor windings on the axially opposite end faces are surrounded by in each case a supporting ring or an end cap which is designed to stabilize the salient-pole rotor. The supporting rings have in particular a seal which can be designed, for example, as an O ring.

In order to close the slots, a sliding cover is arranged in each slot. The sliding covers are at least partially of multi-part design and have the slot closing wedge and the at least one support clamped displaceably in the slot closing wedge. In particular, the sliding cover has two supports which are clamped displaceably and are designed for pressing against the axially opposite supporting rings. The slot closing wedges seal the respective slot radially. In order to axially seal the slot, the at least one support is provided which is mechanically connected to the slot closing wedge, but is mounted displaceably on the slot closing wedge. Preferably, the slot closing wedge has a transverse part extending along the circumferential direction and a longitudinal part extending in the radial direction, wherein the at least one support is clamped displaceably in the transverse part. The slot closing wedge is therefore substantially in the shape of a T profile or Y profile at least in regions. The support has the sealing surface which can be displaced along the axial direction to compensate for component tolerances and can be positioned in such a manner that it is pressed axially against the seal of the supporting ring. The covering slide can be formed, for example, from a plastic, in particular from a thermoplastic.

In order to produce the salient-pole rotor, first of all the windings are arranged on the rotor core. The slots between the rotor poles are then closed by the slot closing wedges being arranged in the slots. In particular, for this purpose, the slot closing wedges are pushed axially into the slots and are held by the pole shoes of the adjacent salient poles. For this purpose, the transverse part has notches which form a form-fitting connection to the pole shoes of the rotor poles when the sliding cover is pushed into the slot. The longitudinal part is arranged inside the slot and extends along the radial direction. After the slot closing wedges are arranged in the slot, the supporting rings are placed onto the end faces of the rotor core. The supports of the sliding covers are then pushed axially against the supporting rings along a displacement path such that they are pressed against the supporting rings, in particular against the seals of the supporting rings.

The tolerance field between the rotor core, the sliding covers and the supporting rings can therefore be compensated for by way of the supports via the displacement path of the supports. By pressing of the supports against the seal of the supporting rings, the desired sealing effect can be achieved. This permits a more cost-effective configuration of the salient-pole rotor.

Particularly preferably, the at least one support and the slot closing wedge have mutually corresponding guide elements, which form a sliding guide, in particular in the form of a dovetail guide, for axially displacing the at least one support with respect to the slot closing wedge. In particular, the support has a sealing body and a pin forming a first of the guide elements. The slot closing wedge has at least one guide channel and a guide slot forming a second of the guide elements, wherein, in order to form the sliding guide, the sealing body is arranged in the guide channel and the pin is arranged in the slot. The guide channel is formed, for example, by two tangentially opposite and axially extending steps in the transverse part of the slot closing wedge. The guide slot in which the pin of the support is arranged and guided linearly can be formed between the steps. The pin is formed in particular integrally with the sealing body, which can be formed cuboidally, for example, and has the sealing surface for pressing against the supporting ring.

It has proven advantageous if the sliding guide has an oversize fit for holding the at least one support in an end position in which the support is pressed against the supporting ring. In particular, in order to provide the oversize fit a width of the sealing body is greater than a width of the guide channel and/or a width of the pin is greater than a width of the guide slot. The support can therefore be displaced by a predetermined minimum force directed axially in the direction of the respective supporting ring being applied to the support. When the force is removed, for example at the desired end position of the support, the latter remains at the current position. Positioning and remaining of the support in the desired end position can therefore be provided in a simple manner. Alternatively or additionally to the oversize fit or interference fit, the at least one support and the slot closing wedge for holding the at least one support in the end position can form a snap-fit connection.

The embodiments presented with regard to the sliding cover according to the invention and the advantages thereof apply correspondingly to the salient-pole rotor according to embodiments of the invention and to the electric machine according to embodiments of the invention.

Further features of the invention will emerge from the claims, the figures and the description of the figures. The features and combinations of features mentioned above in the description and the features and combinations of features mentioned below in the description of the figures and/or shown in the figures alone can be used not only in the respectively stated combination, but also in different combinations or on their own.

The invention will now be explained in more detail with reference to a preferred exemplary embodiment and with reference to the drawings.

BRIEF DESCRIPTION OF THE DRAWINGS

In the figures, identical and functionally identical elements are provided with the same reference signs.

DETAILED DESCRIPTION OF THE DRAWINGS

Figure 1:
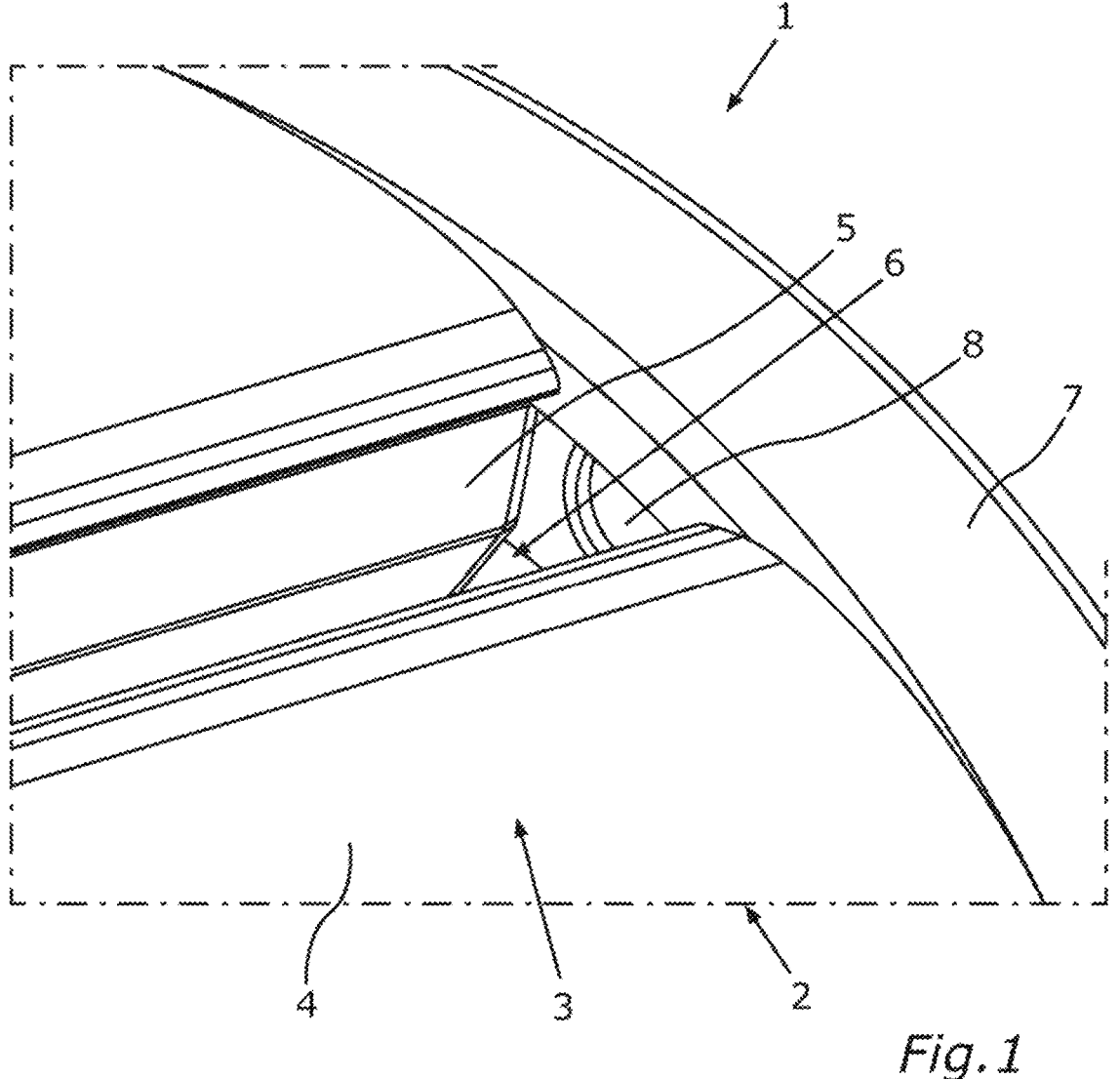
FIG. 1 shows a schematic illustration of a cutout of rotor components of a salient-pole rotor.

FIG. 1 shows rotor components of a cutout of a salient-pole rotor 1 for a current-excited internal-rotor synchronous machine, not shown here. The salient-pole rotor 1 has a rotor core 2 which has a rotor yoke and rotor poles 3 with pole shoes 4. The rotor poles 3 hold rotor windings 5 which are configured for generating a rotor magnetic field. A slot 6 is formed between in each case two rotor poles 3. Supporting rings 7 or end caps are arranged at axial ends or end faces of the rotor core 2 and surround winding heads of the rotor windings 5, which protrude on the end faces of the rotor core 2. The supporting rings 7 here have an opening 8 via which a potting compound can be filled into the slots 6 to stabilize the rotor 1.

Figure 2:
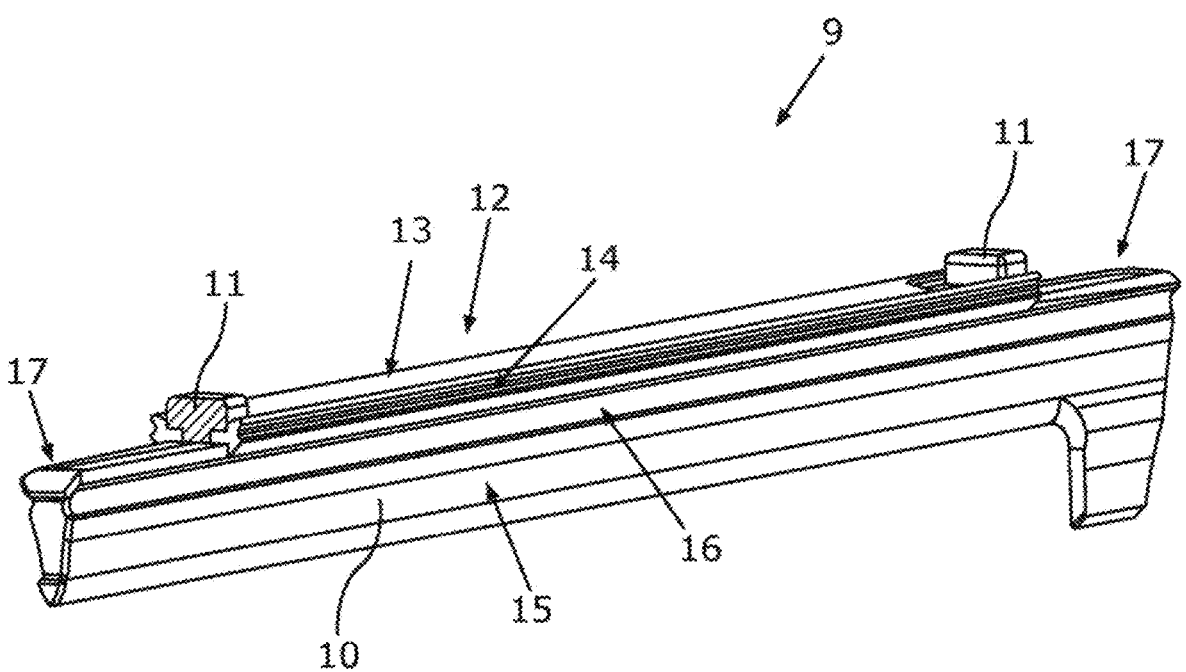
FIG. 2 shows a schematic perspective illustration of an embodiment of a sliding cover for the salient-pole rotor.
Figure 3:
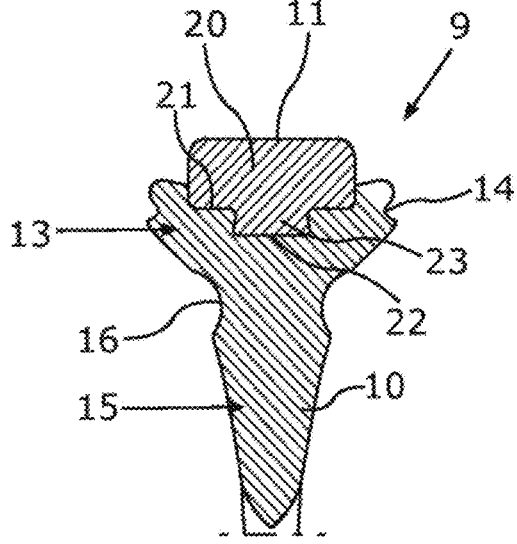
FIG. 3 shows a schematic cross-sectional illustration of the sliding cover.
Figure 4:
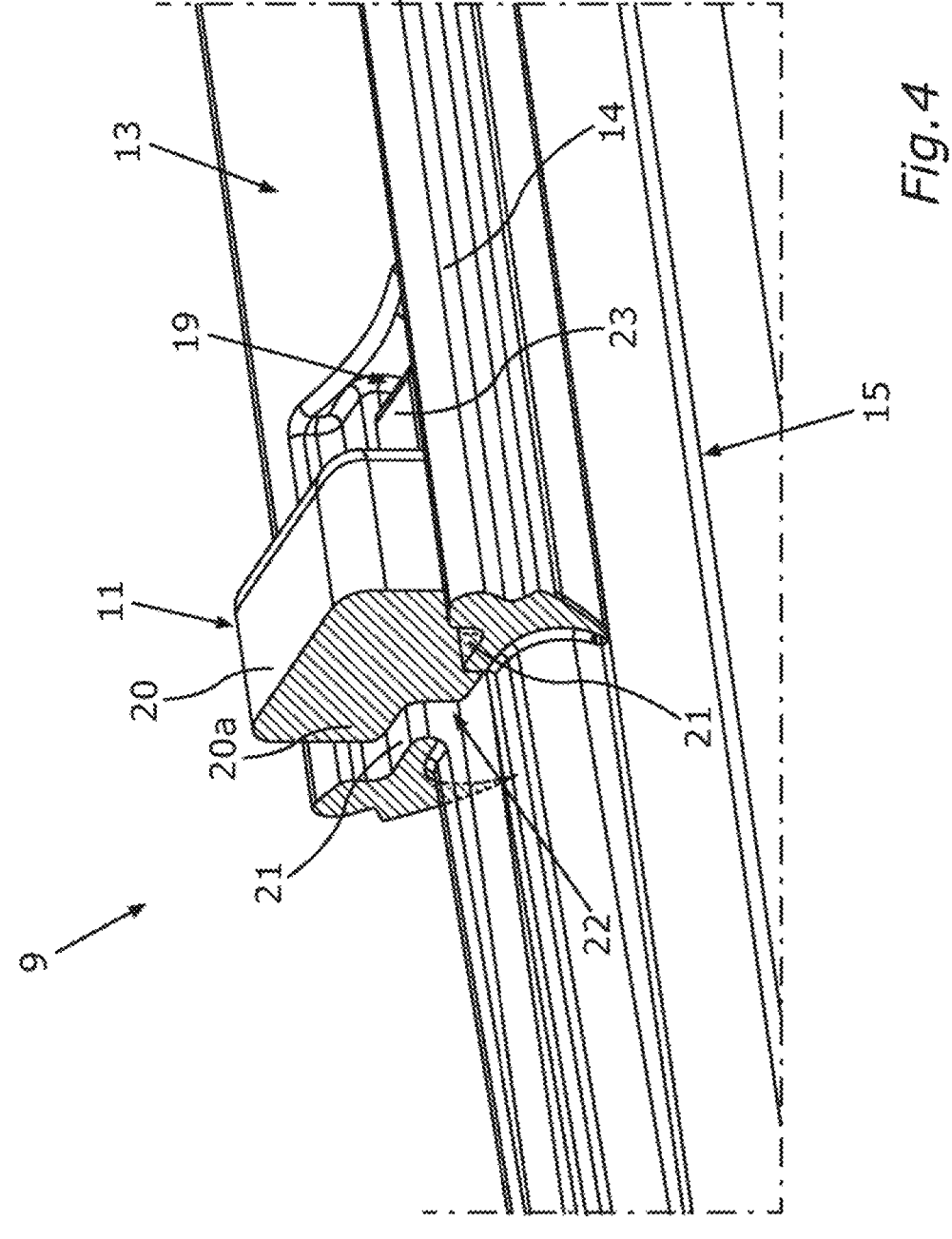
FIG. 4 shows a further schematic perspective illustration of the sliding cover.
Figure 5:
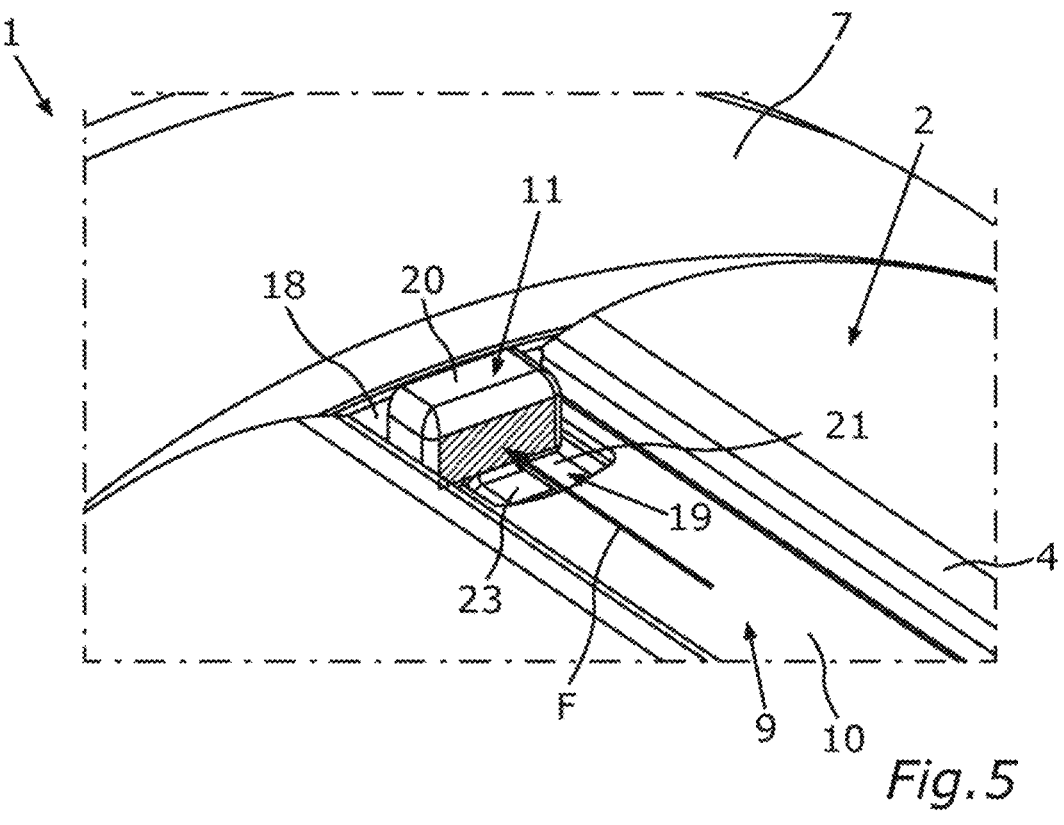
FIG. 5 shows a schematic perspective illustration of the salient-pole rotor with the support of the sliding cover in an initial position.

For axially and radially closing and sealing the slot 6, the salient-pole rotor 1 has a sliding cover 9, an embodiment of which is shown in a perspective illustration in FIG. 2. The sliding cover 9 is of multi-part design and has a slot closing wedge 10 and two axially displaceable supports 11 clamped in the slot closing wedge 10. As is shown in FIG. 2 and with reference to the cross-sectional illustration of the sliding cover 9 in FIG. 3, the slot closing wedges 10 have a region 12 substantially in the shape of a T profile or Y profile. In order to install the salient-pole rotor 1, the slot closing wedges 10 can be pushed into the slots 6 for radial sealing before the supporting rings 7 are arranged on the end faces of the rotor core 2. As shown in FIG. 4 and FIG. 5, the supports 11 are in an initial position. On being pushed into the slots 6, the slot closing wedges 10 can be connected mechanically, for example in a form-fitting manner, to the pole shoes 4 of the adjacent rotor poles 3. For this purpose, a transverse web 13, extending in the circumferential direction, of the T-shaped region 12 of the slot closing wedge 10 has lateral notches 14 which extend in the axial direction and can be pushed together with lug-like protrusions of the pole shoes 4.

In the state of the sliding cover 9 arranged on the rotor core 2, a longitudinal web 15 of the slot closing wedge 10 is arranged in the slot 6 and oriented in the radial direction. In addition, the slot closing wedge 10 here has undercuts 16 which are filled with the potting compound in order to fix the slot closing wedge 10 in the slot 6. After the slot closing wedge 10 is pushed into the slot 6, the supporting rings 7 are arranged on the rotor core 2. End regions 17 of the slot closing wedge 10 that are adjacent to the region 12 in the shape of a T profile protrude on the end faces of the rotor core 2 and are arranged in the supporting rings 7.

Figure 6:
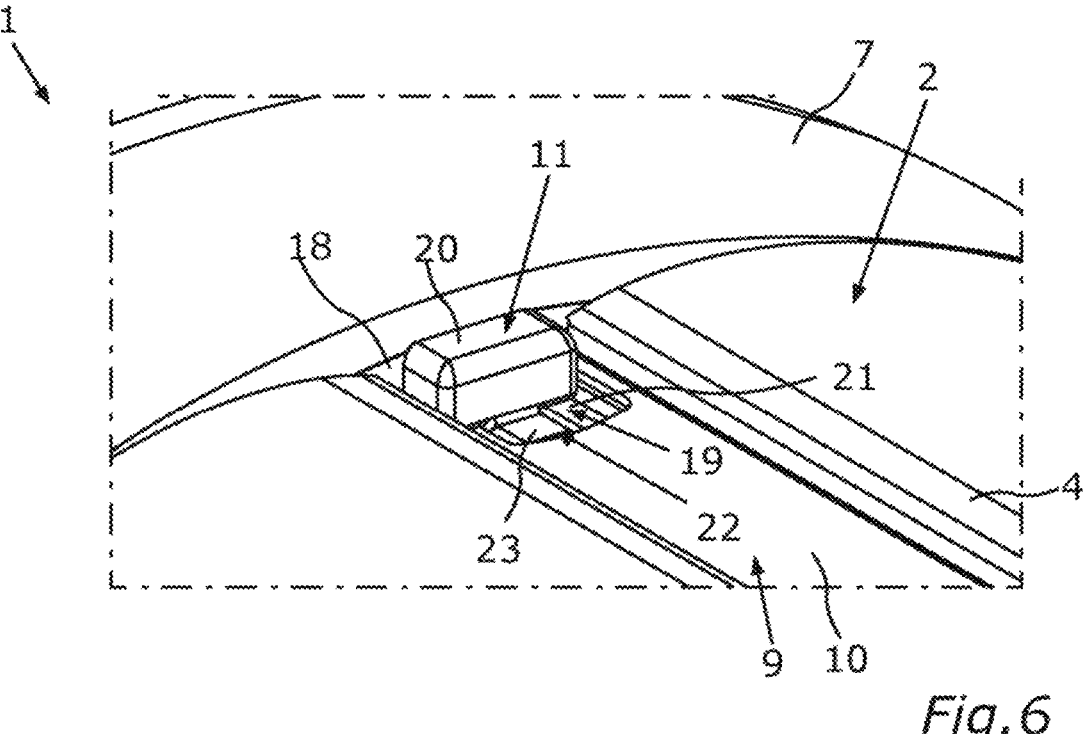
FIG. 6 shows a schematic perspective illustration of the salient-pole rotor with the support of the sliding cover in an end position.

For the axial sealing, the supports 11, which are mounted in a force-displaceable manner, are then pushed with a force F in the direction of the respective supporting ring 7 (see FIG. 5) until they have reached an end position (see FIG. 6) and are pressed against the supporting rings 7, in particular against a seal 18 of the respective supporting ring 7. The pressing of the supports 11 against the supporting rings 7 can be carried out, for example, by way of a force-controlled punch.

These supports 11 can be configured in a wide variety of forms. For the displaceable mounting of the supports 11 on the slot closing wedge 10, the transverse web 13 forms a frame which forms a sliding guide with the support 11, which acts as a carriage. For this purpose, the transverse web 13 for each support 11 has a guide channel 19 in which a cuboidal sealing body 20 of the support 11 is mounted in an axially displaceable manner. The sealing body 20 has a sealing surface 20*a*. The guide channel 19 has two axially extending steps 21 which lie opposite in the circumferential direction and on which edge regions of the sealing body 20 rest. A guide slot 22 in which a pin 23 or wedge arranged on the sealing body 20 is mounted displaceably is formed in the guide channel 19. The guide slot 22 and the pin 23 form, for example, a dovetail guide through which the support 11 is movable only along the axial direction, but not along the circumferential direction or the radial direction. The sliding guide has in particular an oversize fit or interference fit in which a width of the sealing body 20 and/or of the pin 23 in the circumferential direction is greater than a width of the guide channel 19 and/or of the guide slot 22. It can thus be ensured that the support 11 remains in an end position in which the sealing surface 20*a* of the sealing body 20 is pressed against the supporting ring 7.

What is claimed is:

1. A multi-part sliding cover for a salient-pole rotor of an electric machine, wherein the sliding cover is configured to close a slot formed between two rotor poles of the salient-pole rotor which are adjacent in a circumferential direction and two axially opposite supporting rings of the salient-pole rotor, the sliding cover comprising:
   a slot closing wedge, which is mechanically connectable to the two adjacent rotor poles, and
   a support which is guided in the slot closing wedge and has a sealing surface of the sliding cover for pressing against at least one of the supporting rings and which is displaceable axially along the slot closing wedge in order to change an axial position of the sealing surface, wherein:
   the support and the slot closing wedge have mutually corresponding guide elements, which form a sliding guide for axially displacing the support with respect to the slot closing wedge, the support has a sealing body and a pin forming a first of the guide elements,
the slot closing wedge has a guide channel and a guide slot forming a second of the guide elements, and
in order to form the sliding guide, the sealing body is arranged in the guide channel and the pin is arranged in the guide slot.

2. The sliding cover according to claim 1, wherein the sliding cover has two supports which are clamped displaceably in the slot closing wedge and are configured to press against the axially opposite supporting rings.

3. The sliding cover according to claim 1, wherein:
   the slot closing wedge has a transverse part extending along the circumferential direction and a longitudinal part extending in a radial direction, and
   the support is clamped displaceably in the transverse part.

4. The sliding cover according to claim 3, wherein the transverse part has notches which form a form-fitting connection to pole shoes of the rotor poles when the sliding cover is pushed into the slot.

5. The sliding cover according to claim 1, wherein the sliding guide is a dovetail guide.

6. The sliding cover according to claim 1, wherein the sliding guide has an oversize fit for holding the support in an end position in which the support is pressed against the supporting ring.

7. The sliding cover according to claim 6, wherein in order to provide the oversize fit, a width of the sealing body and/or a width of the pin is greater than a width of the guide channel and/or a width of the guide slot.

8. A salient-pole rotor for an electric machine of a motor vehicle, the rotor comprising:
   rotor windings for forming a rotor magnetic field,
   a rotor core with a rotor yoke and a number of rotor poles corresponding to a number of rotor windings for holding the rotor windings, wherein a respective slot is formed between two respective adjacent rotor poles, and wherein the rotor windings form winding heads on axially mutually opposite end faces of the rotor core,
   supporting rings arranged on the end faces for encasing the winding heads, and
   the sliding cover according claim 1 for closing the respective slot,
   wherein the support which is displaceable axially along the slot closing wedge is positioned such that the support is pressed against at least one of the supporting rings for sealing purposes.

9. An electric machine for a motor vehicle, the electrical machine comprising:
   a stator, and
   the rotor according to claim 8, wherein the rotor is mounted rotatably with respect to the stator.

* * * * *